United States Patent
He et al.

(10) Patent No.: US 12,103,469 B2
(45) Date of Patent: Oct. 1, 2024

(54) VEHICLE INTERIOR COMPONENTS HAVING FLEXIBLE SURFACE LAYERS

(71) Applicant: Inteva Products, LLC, Troy, MI (US)

(72) Inventors: Xinhua He, Bloomfield Hills, MI (US); Kenneth Gassman, Lake Orion, MI (US); Jeffrey Macgregor, Goodrich, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 518 days.

(21) Appl. No.: 17/146,730

(22) Filed: Jan. 12, 2021

(65) Prior Publication Data
US 2021/0213891 A1    Jul. 15, 2021

Related U.S. Application Data

(60) Provisional application No. 62/960,397, filed on Jan. 13, 2020.

(51) Int. Cl.
*B60R 13/02* (2006.01)
*B32B 7/023* (2019.01)

(52) U.S. Cl.
CPC .............. *B60R 13/02* (2013.01); *B32B 7/023* (2019.01); *B32B 2307/41* (2013.01); *B32B 2307/414* (2013.01); *B32B 2605/003* (2013.01); *B60R 2013/0287* (2013.01)

(58) Field of Classification Search
CPC . B60R 13/02; B60R 2013/0287; B32B 7/023; B32B 2307/41; B32B 2307/414; B32B 2605/003; B60Q 3/54; B60Q 3/14; B60Q 3/312
See application file for complete search history.

(56) References Cited

U.S. PATENT DOCUMENTS

| 5,448,028 A | * | 9/1995 | Filion | ................... | B60N 2/797 |
| | | | | | 200/52 R |
| 6,444,311 B1 | | 9/2002 | Friedman et al. | | |
| 7,845,836 B2 | | 12/2010 | Okuda | | |

(Continued)

FOREIGN PATENT DOCUMENTS

| CN | 101204862 A | | 6/2008 | | |
| CN | 101646543 A | * | 2/2010 | ............. | B29C 43/18 |

(Continued)

OTHER PUBLICATIONS

International Preliminary Report on Patentability for International Application No. PCT/US2021/013070; International Filing Date Jan. 12, 2021; Date of Mailing May 10, 2021; 7 pages.

(Continued)

*Primary Examiner* — Lori Lyjak
(74) *Attorney, Agent, or Firm* — CANTOR COLBURN LLP

(57) ABSTRACT

A vehicular trim component including a substrate and a continuous flexible surface layer wherein at least a portion of the continuous flexible surface layer has a visible light transmission of 5 to 30% as determined by ASTM D1003 or a visible light transmission greater than or equal to 80% as determined by ASTM D1003. Optionally a flexible backing layer may be disposed between the substrate and the continuous flexible surface layer.

12 Claims, 3 Drawing Sheets

(56) References Cited

U.S. PATENT DOCUMENTS

| | | | |
|---|---|---|---|
| 10,513,221 B2 * | 12/2019 | Cho | B60K 35/10 |
| 10,870,263 B2 * | 12/2020 | Stewart | B32B 27/32 |
| 10,889,085 B2 | 1/2021 | Gasworth | |
| 10,906,476 B2 * | 2/2021 | Preisler | B60R 13/005 |
| 2002/0101738 A1 | 8/2002 | Misaras | |
| 2005/0241930 A1 * | 11/2005 | Stevenson | H01H 13/702 |
| | | | 200/512 |
| 2006/0024476 A1 * | 2/2006 | Leland | B60R 13/00 |
| | | | 428/172 |
| 2006/0101685 A1 * | 5/2006 | Smith, III | G09F 21/049 |
| | | | 40/556 |
| 2008/0129071 A1 | 6/2008 | Hipshier et al. | |
| 2010/0045060 A1 | 2/2010 | Hipshier | |
| 2013/0323481 A1 | 12/2013 | Gasworth | |
| 2015/0274066 A1 | 10/2015 | Del Pozo Gonzalez et al. | |
| 2015/0307033 A1 * | 10/2015 | Preisler | B60Q 3/20 |
| | | | 296/1.08 |
| 2016/0355124 A1 * | 12/2016 | Cervantes Guarneros | |
| | | | B60Q 3/80 |
| 2016/0375843 A1 * | 12/2016 | Faik | B32B 7/023 |
| | | | 296/1.08 |
| 2017/0291536 A1 * | 10/2017 | Cannon | B60Q 3/54 |
| 2019/0275930 A1 * | 9/2019 | Cho | G02B 6/006 |
| 2019/0275931 A1 * | 9/2019 | Cho | B60K 35/10 |
| 2019/0275934 A1 * | 9/2019 | Cho | B60Q 3/217 |
| 2020/0189457 A1 * | 6/2020 | Bachmeier | B60Q 3/62 |

FOREIGN PATENT DOCUMENTS

| | | | | |
|---|---|---|---|---|
| DE | 60035093 T2 | | 7/2007 | |
| DE | 102010043960 A1 | | 5/2012 | |
| DE | 102015104299 A1 | | 9/2016 | |
| DE | 102016218916 A1 | | 3/2018 | |
| DE | 102017216130 A1 | * | 3/2019 | |
| DE | 102017222957 A1 | * | 6/2019 | B32B 25/08 |
| EP | 3476658 A1 | | 5/2019 | |
| JP | 2001171055 A | | 6/2001 | |
| JP | 2015089749 A | | 5/2015 | |
| JP | 2016087241 A | | 5/2016 | |
| JP | 2017095046 A | * | 6/2017 | |
| JP | 2019123255 A | | 7/2019 | |
| WO | WO-2017165294 A1 | * | 9/2017 | B29C 43/02 |
| WO | WO-2017195002 A1 | * | 11/2017 | B60Q 3/217 |

OTHER PUBLICATIONS

International Search Report for International Application No. PCT/US2021/013070; International Filing Date: Jan. 12, 2021; Date of Mailing: May 10, 2021; 4 pages.

Written Opinion for International Application No. PCT/US2021/013070; International Filing Date: Jan. 12, 2021; Date of Mailing: May 10, 2021; 6 pages.

Chinese Office Action dated Jul. 9, 2023; Chinese Application No. 202180009021.8; 6 pages (non-English).

Chinese Office Action dated Jul. 9, 2023; Chinese Application No. 202180009021.8; 8 pages (English).

Supplemental European Search Report for EP Application No. 21741181; Mailing Date, Jan. 3, 2024.

Written Opinion for EP Application No. 21741181; Mailing Date, Jan. 3, 2024.

CNIPA Notification of the Second Office Action corresponding to CN Application No. 202180009021.8; Issue Date, Mar. 8, 2024.

EPO Communication pursuant to Rules 70-2 and 70a-2 EPC corresponding to EP Application No. 21741181.8; Mailing Date, Feb. 2, 2024.

CNIPA Notification of the Decision of Rejection corresponding to CN Application No. 202180009021.8; Issue Date, Jun. 1, 2024.

JPO Notice of Reasons for Rejection corresponding to JP Application No. 2022-541648; Issue Date, Jun. 4, 2024.

* cited by examiner

VEHICLE INTERIOR COMPONENTS HAVING FLEXIBLE SURFACE LAYERS

CROSS-REFERENCE TO RELATED APPLICATIONS

This application claims the benefit of U.S. Provisional Application No. 62/960,397, filed Jan. 13, 2020, the disclosure of which is incorporated herein by reference in its entirety.

BACKGROUND

This invention relates to an interior structure for a vehicle interior. More particularly, the invention relates to an interior trim component.

Currently, an interior show surface of a vehicle component is formed from a material (e.g., leather, vinyl, thermoplastic olefin (TPO), cloth, etc.) that is cut or formed in a pattern and secured to a component such as a seat cushion, head rest, arm rest, console lid, instrument panel substrate, etc.

Recently, automotive manufactures have shown an interest in applying more detail and functionality to interior vehicle surfaces over a wider range of price classes.

Accordingly, it is desirable to provide an improved interior component surface and method of making the same with additional features.

SUMMARY OF THE INVENTION

Disclosed herein is a vehicular trim component including a substrate and a continuous flexible surface layer wherein at least a portion of the continuous flexible surface layer has a visible light transmission greater than or equal to 80% as determined by ASTM D1003. The continuous flexible surface layer may have a haze of less than or equal to 20% as determined by ASTM D1003. The continuous flexible layer may include a graphic design. The continuous flexible layer may include a functional element 50 such as a switch, sensor, display or combination thereof that may integrate with an automotive system (see FIG. 2).

The above mentioned vehicular trim component may further include a flexible backing layer disposed between the substrate and the continuous flexible surface layer. The backing layer may be translucent (have a haze greater than or equal to 20% as determined by ASTM D1003) or fully opaque.

Disclosed herein is a vehicular trim component including a substrate and a continuous flexible surface layer wherein at least a portion of the continuous flexible surface layer has a visible light transmission of 5 to 30% as determined by ASTM D1003. The continuous flexible surface layer may have a haze of less than or equal to 20% as determined by ASTM D1003. The continuous flexible layer may include a graphic design. The continuous flexible layer may include a functional element such as a switch, sensor, display or combination thereof that may integrate with an automotive system.

The above mentioned vehicular trim component may further comprise a flexible backing layer disposed between the substrate and the continuous flexible surface layer. The backing layer may be translucent or fully opaque.

BRIEF DESCRIPTION OF THE DRAWINGS

Other features, advantages and details appear, by way of example only, in the following description of embodiments, the description referring to the drawings in which.

DETAILED DESCRIPTION

Figure 1:
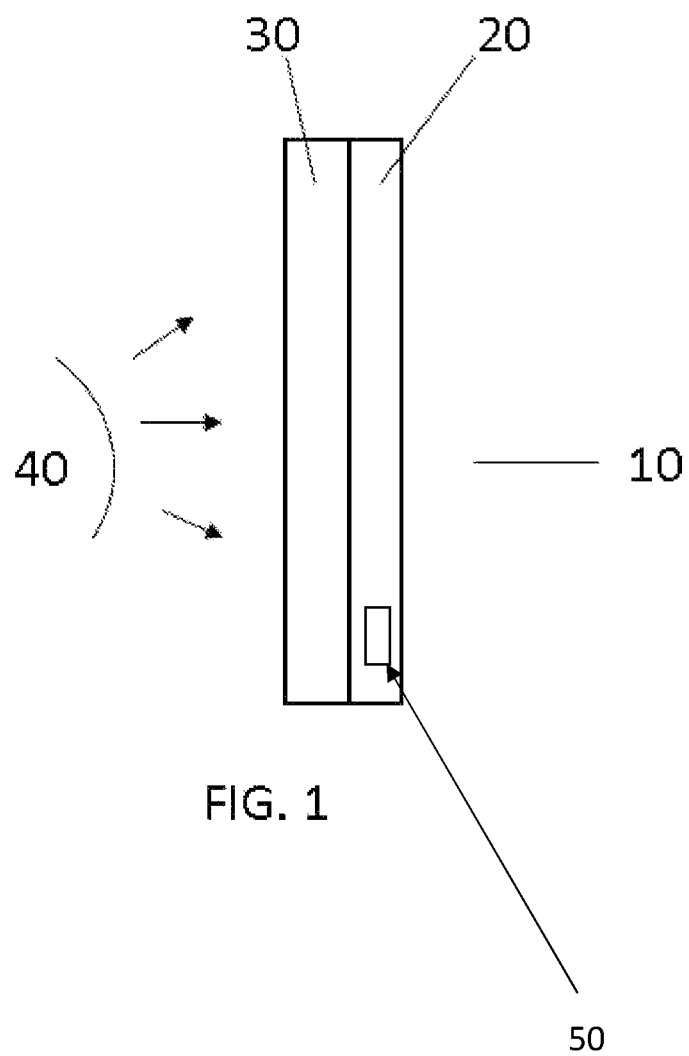
FIGS. 1, 2, 2A and 3 illustrate vehicular trim pieces as described herein.

Described herein is a vehicular trim component including a continuous flexible layer having a desired level of light transmission and a haze of less than or equal to 20%. Light transmission indicates the amount of light that passes through a material whereas haze is a measure of the clarity of the material. A transparent material has a visible light transmission greater than or equal to 80%. Lower visible light transmissions of 5 to 30% appear opaque when not illuminated but transmit sufficient light when illuminated from the side opposite of the viewer to render designs on or adjacent to the material visible to the viewer. The continuous flexible layer is the show surface and no additional layers are deposited on this layer aside from optional protective layers that may be employed during shipping.

The continuous flexible layer may be disposed at least partially on a substrate. The substrate provides support to the continuous flexible layer. Exemplary substrate materials include metals, thermoplastic composites and the like. The substrate may have a surface area less than or equal to 50%, or less than or equal to 75%, or less than or equal to 90% of the surface area of the continuous flexible layer. The substrate may provide design elements such as color, texture, patterns or the like.

A backing layer may be disposed between the continuous flexible layer and the substrate. The backing layer is flexible but is not transparent although it may transmit up to 75% of visible light as determined by ASTM D1003. The haze value of the backing layer is not particularly essential and may be determined by the needs of any graphic design elements employed.

Flexible is defined herein as having the ability to bend at least 180 degrees and back to 0 degrees without any visible changes to its physical, optical or mechanical properties where the radius to thickness ratio is greater than or equal to 5.

Various embodiments can be used as vehicular trim parts for example, automotive interior inserts, boating trim, etc. Vehicular trim parts, as used herein, include interior vehicular trim that is present on the seats, doors, side walls, console, dash board, instrument display, seats and the like. Vehicular trim parts, as used herein, do not include flooring, floor mats or door sills.

The continuous flexible layer comprises a transparent thermoplastic olefin, thermoplastic elastomer, polycarbonate, polyethylene, polypropylene, or polyurethane. In embodiments where a portion of the continuous flexible layer has a visible light transmission is 5 to 30% the continuous flexible layer further comprises additives such as pigments, colorants, additional polymers, or a combination of the foregoing.

The continuous flexible layer may comprise a graphic design. The graphic design may be located on the surface or embedded in the continuous flexible layer. When a graphic design is present the visible light transmission and haze value are determined in areas free of the graphic design. The continuous flexible layer may also comprise a functional element. Exemplary functional elements include switches, sensors, visual displays, and combinations thereof. The functional element may be integrated with an automotive system. For example, a fingerprint sensor may be integrated with an ignition system or a switch may be integrated with an illumination system.

The backing layer, when present, may comprise a graphic design. The graphic design may be located on the surface or embedded in the backing layer. When a graphic design is present the visible light transmission and haze value are determined in areas free of the graphic design. The backing layer may also comprise a functional element. Exemplary functional elements include switches, sensors, visual displays, and combinations thereof. The functional element may be integrated with an automotive system. For example, a fingerprint sensor may be integrated with an ignition system or a switch may be integrated with an illumination system. It is also contemplated that a functional element may be located between the backing layer and the continuous flexible layer. The backing layer may comprise a material which is the same as or different from the continuous flexible layer.

The continuous flexible layer may have a thickness of 0.001 to 5 millimeters (mm). Within this range the thickness may be 0.01 to 4 mm, or 0.1 to 3.5 mm. The backing layer, when present, may have a thickness of 0.001 to 5 millimeters (mm). Within this range the thickness may be 0.01 to 4 mm, or 0.1 to 3.5 mm.

Figure 2:
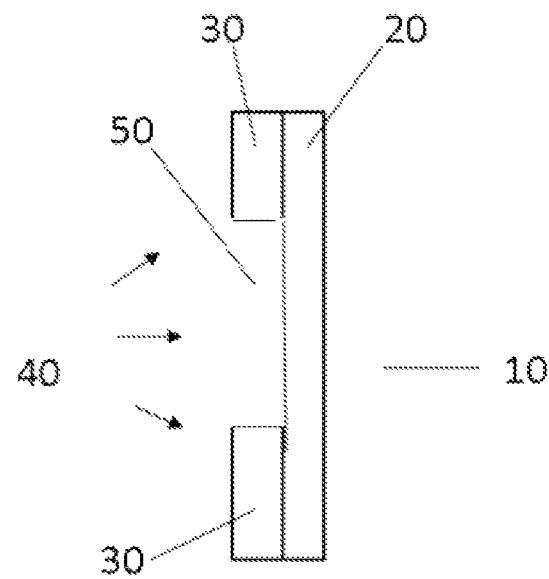
Figure 2A:
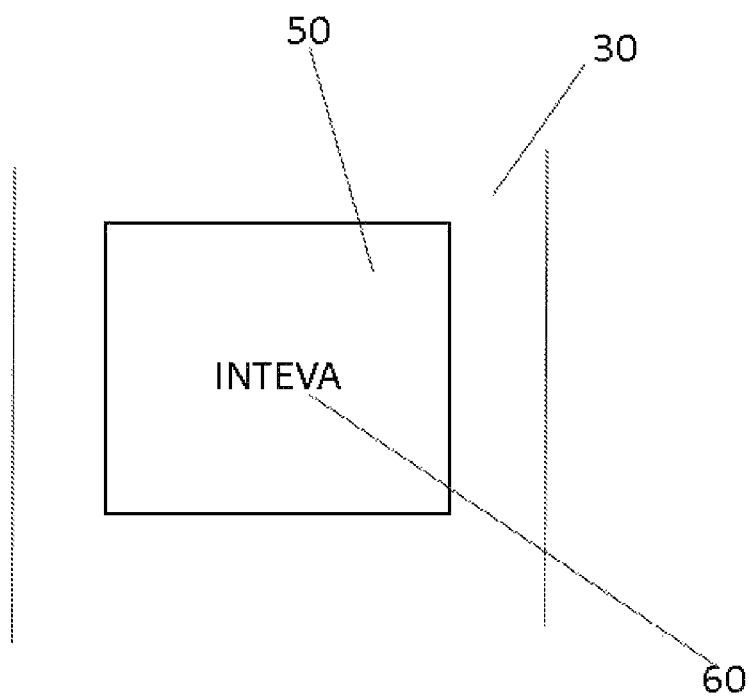

Referring now to the FIGS, FIG. 1 shows a cross section of a vehicular trim component 10 having a continuous flexible layer 20 disposed on a substrate 30. An optional light source 40 is shown on the side of the substrate opposite of the continuous flexible layer. When the light source is present then the substrate includes one or more openings for the light to pass through. This is shown more explicitly in FIG. 2 where the substrate 30 has an opening 50 for the light to pass through to the continuous flexible layer 20. FIG. 2A shows a front view of the trim component shown in FIG. 2. The opening in the substrate allows light to pass through and illuminate around the design element 60 in the continuous flexible layer 20.

Figure 3:
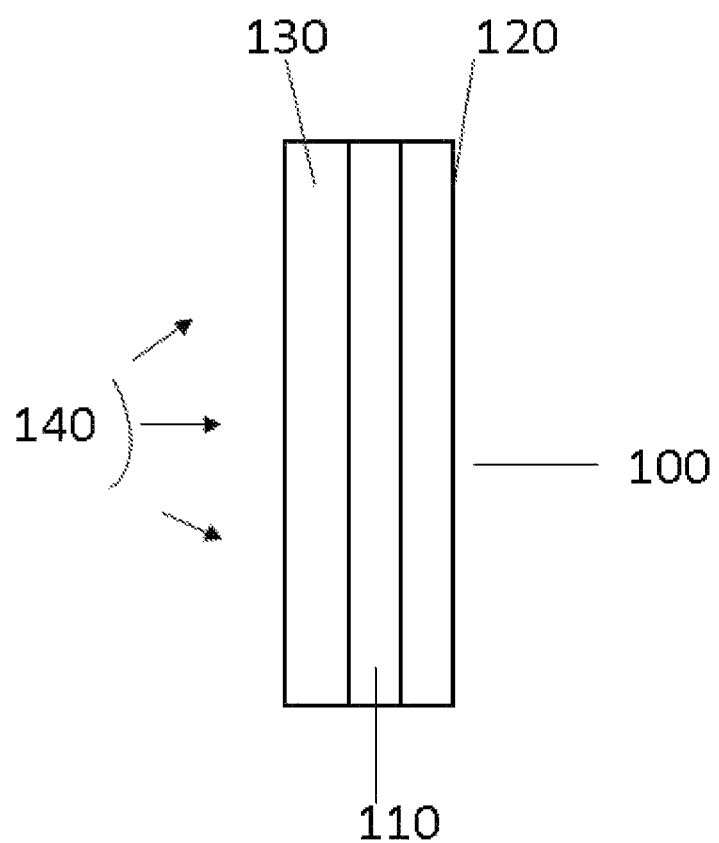

FIG. 3 shows a cross section of a vehicular trim component 100 having a backing layer 110 disposed between continuous flexible layer 120 and a substrate 130. An optional light source 140 is located on the side of the substrate opposite of the continuous flexible layer.

The vehicular trim component described herein provides a unique combination of functionality, light weight and seamless integration. The ability to incorporate decorative and functional elements in the trim component while maintaining a continuous surface is an attractive option as it reduces the number of junctions which can collect dirt and other undesirable materials. Additionally, the flexibility of the continuous flexible layer and the optional backing layer enhance the ability of surface materials to cover a curved substrate without gaps, wrinkles or seams.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A vehicular trim component comprising a substrate and a continuous flexible surface layer that defines a show surface and wherein at least a portion of the continuous flexible surface layer defining the show surface has a visible light transmission greater than or equal to 80% as determined by ASTM D1003;
   wherein the continuous flexible surface layer comprises a functional element embedded or behind the show surface and a graphic design embedded in the continuous flexible layer.

2. The vehicular trim component of claim 1, wherein the continuous flexible surface layer has a haze of less than or equal to 20% as determined by ASTM D1003.

3. The vehicular trim component of claim 1, wherein the functional element is a switch, sensor, display or combination thereof.

4. The vehicular trim component of claim 1, wherein the functional element integrates with an automotive system.

5. A vehicular trim component comprising a substrate and a continuous flexible surface layer that defines a show surface and wherein at least a portion of the continuous flexible surface layer defining the show surface has a visible light transmission greater than or equal to 80% as determined by ASTM D1003; and a flexible backing layer disposed between the substrate and the continuous flexible surface layer, wherein the flexible backing layer is translucent.

6. A vehicular trim component comprising a substrate and a continuous flexible surface layer that defines a show surface and wherein at least a portion of the continuous flexible surface layer defining the show surface has a visible light transmission of 5 to 30% as determined by ASTM D1003;
   wherein the continuous flexible layer comprises a functional element embedded or behind the show surface and a graphic design embedded in the continuous flexible layer.

7. The vehicular trim component of claim 6, wherein the continuous flexible surface layer has a haze of less than or equal to 20% as determined by ASTM D1003.

8. The vehicular trim component of claim 6, wherein the functional element is a switch, sensor, display or combination thereof.

9. The vehicular trim component of claim 6, wherein the functional element integrates with an automotive system.

10. A vehicular trim component comprising a substrate and a continuous flexible surface layer that defines a show surface and wherein at least a portion of the continuous flexible surface layer defining the show surface has a visible light transmission of 5 to 30% as determined by ASTM D1003; and a flexible backing layer disposed between the substrate and the continuous flexible surface layer, wherein the flexible backing layer is translucent.

11. The vehicular trim component of claim 1, wherein no additional layers are deposited on the show surface.

12. The vehicular trim component of claim 6, wherein no additional layers are deposited on the show surface.

* * * * *

UNITED STATES PATENT AND TRADEMARK OFFICE
CERTIFICATE OF CORRECTION

| | | |
|---|---|---|
| PATENT NO. | : 12,103,469 B2 | Page 1 of 1 |
| APPLICATION NO. | : 17/146730 | |
| DATED | : October 1, 2024 | |
| INVENTOR(S) | : Xinhua He, Kenneth Glassman and Jeffrey Macgregor | |

It is certified that error appears in the above-identified patent and that said Letters Patent is hereby corrected as shown below:

In the Claims

Column 4 Claim 1, Line 14 please change "flexible layer" to "flexible surface layer";
Column 4 Claim 6, Line 37 please change "flexible layer" to "flexible surface layer"; and
Column 4 Claim 6, Line 40 please change "flexible layer" to "flexible surface layer".

Signed and Sealed this
Sixth Day of May, 2025

Coke Morgan Stewart
*Acting Director of the United States Patent and Trademark Office*